United States Patent
Winter

(10) Patent No.: US 7,461,385 B2
(45) Date of Patent: Dec. 2, 2008

(54) METHOD FOR ESTABLISHING A NEW USER INTERFACE VIA AN INTERMINGLED USER INTERFACE

(75) Inventor: Tony Jon Winter, Ventura, CA (US)

(73) Assignee: QAD Corporation, Carpinteria, CA (US)

(*) Notice: Subject to any disclaimer, the term of this patent is extended or adjusted under 35 U.S.C. 154(b) by 786 days.

(21) Appl. No.: 10/430,045

(22) Filed: May 6, 2003

(65) Prior Publication Data
US 2004/0226027 A1    Nov. 11, 2004

(51) Int. Cl.
*G06F 9/00* (2006.01)
(52) U.S. Cl. .............. 719/328; 717/105; 717/109; 717/134; 717/136; 705/1; 703/27
(58) Field of Classification Search ............. 719/328; 717/114, 118, 105, 109, 134, 136; 711/328; 345/214, 594; 171/104, 134, 136, 137; 705/1; 703/27
See application file for complete search history.

(56) References Cited

U.S. PATENT DOCUMENTS

| | | | |
|---|---|---|---|
| 6,304,261 B1 * | 10/2001 | Shields et al. ............... 715/702 |
| 6,601,233 B1 * | 7/2003 | Underwood ................. 717/102 |
| 6,675,371 B1 * | 1/2004 | York et al. ................... 717/114 |
| 6,687,702 B2 * | 2/2004 | Vaitheeswaran et al. ...... 707/10 |
| 6,907,546 B1 * | 6/2005 | Haswell et al. ............... 714/38 |
| 6,915,520 B2 * | 7/2005 | Sanchez, II ................. 719/315 |
| 6,996,800 B2 * | 2/2006 | Lucassen et al. ............ 717/106 |
| 7,028,306 B2 * | 4/2006 | Boloker et al. .............. 719/310 |
| 7,131,116 B1 * | 10/2006 | Krishna ....................... 717/136 |
| 2003/0154467 A1 * | 8/2003 | Charnell ..................... 717/140 |
| 2004/0153992 A1 * | 8/2004 | Molina-Moreno et al. .. 717/105 |

* cited by examiner

*Primary Examiner*—Meng-Ai An
*Assistant Examiner*—Phuong N. Hoang
(74) *Attorney, Agent, or Firm*—RatnerPrestia

(57) ABSTRACT

A method of separating a function of the business logic of an application from a user interface of the application where the business logic and user interface of the application are intermingled is provided. The method includes providing a wrapper interface for the application. The method also includes providing a function of the business logic of the application separated from the user interface of the application through the wrapper interface.

21 Claims, 8 Drawing Sheets

METHOD FOR ESTABLISHING A NEW USER INTERFACE VIA AN INTERMINGLED USER INTERFACE

FIELD OF THE INVENTION

This invention relates to interacting with an application, and more particularly to interacting with an application that is wrapped with an interface wrapper.

BACKGROUND OF THE INVENTION

Certain data resource systems include data and associated applications that are developed over extended periods of time (e.g., decades). For example, various enterprise resource planning (i.e., ERP) systems utilize legacy based systems (e.g., MFG/PRO, SAP, etc.). Such legacy systems often include thousands of programs, many of which are in a programming language that may be used in a legacy system (e.g., Oracle, Progress, etc.). Many of these programs offer numerous functions (e.g., report, enquiry, and maintenance functions).

In some legacy systems, the purpose of the maintenance functions is to take data (e.g., through an interface), apply certain rules to the data (through business logic), and to then store the result in a database (persistence). Typically, each maintenance program performs all three of these functions without distinction, whether user driven or business document driven (i.e., EDI (electronic data interchange), XML).

With the current state of technological advances, it is often desirable for legacy systems to accept and interact with data from multiple interfaces (e.g., user entry, the Internet, EDI, XML, other ERP systems, etc.). In hindsight, the task of providing multiple interfaces to legacy systems could have been accomplished by separating the business logic from the interface during creation of each application or program. Such an approach could allow multiple interfaces to be exchanged seamlessly. Unfortunately, such an approach was typically not considered during the development of the library of applications included in legacy systems.

As such, existing legacy systems include thousands of programs including an intermingled user interface and business logic. In order to separate the user interface from the business logic, all of the existing legacy system applications could be rewritten using new coding techniques and using the most up-to-date technologies. Alternatively, each piece of code in the legacy system could be modified in order to manually remove the user interface and to replace the interface with input parameters.

Unfortunately, each of these alternatives is undesirable in that re-writing or modifying an existing legacy system code base is a very substantial undertaking.

As such, it would be desirable to provide an improved method for separating the user interface and business logic of legacy based system applications.

SUMMARY OF THE INVENTION

In an exemplary embodiment of the present invention, a method of separating a function of business logic of an application from a user interface of the application where the business logic and user interface of the application are intermingled is provided. The method includes providing a wrapper interface for the application. The method also includes providing a function of the business logic of the application separated from the user interface of the application through the wrapper interface.

According to certain exemplary embodiments of the present invention, a user interface and/or an external system can interact with the business logic of the application through an exposed API.

In another exemplary embodiment of the present invention, a computer readable carrier including computer program instructions which cause a computer to implement a method of separating a function of business logic of an application from a user interface of the application, where the business logic and user interface of the application are intermingled, is provided. The method includes providing a wrapper interface for the application. The method also includes providing a function of the business logic of the application separated from the user interface of the application through the wrapper interface.

In yet another exemplary embodiment of the present invention, a wrapped application is provided. The wrapped application includes an application having an intermingled user interface and business logic. The wrapped application also includes a wrapper for wrapping the application such that a function of business logic of the application is separated from the user interface of the application.

BRIEF DESCRIPTION OF THE DRAWINGS

Exemplary embodiments of the invention will be described with reference to the drawings, of which.

DETAILED DESCRIPTION OF THE INVENTION

Figure 1:
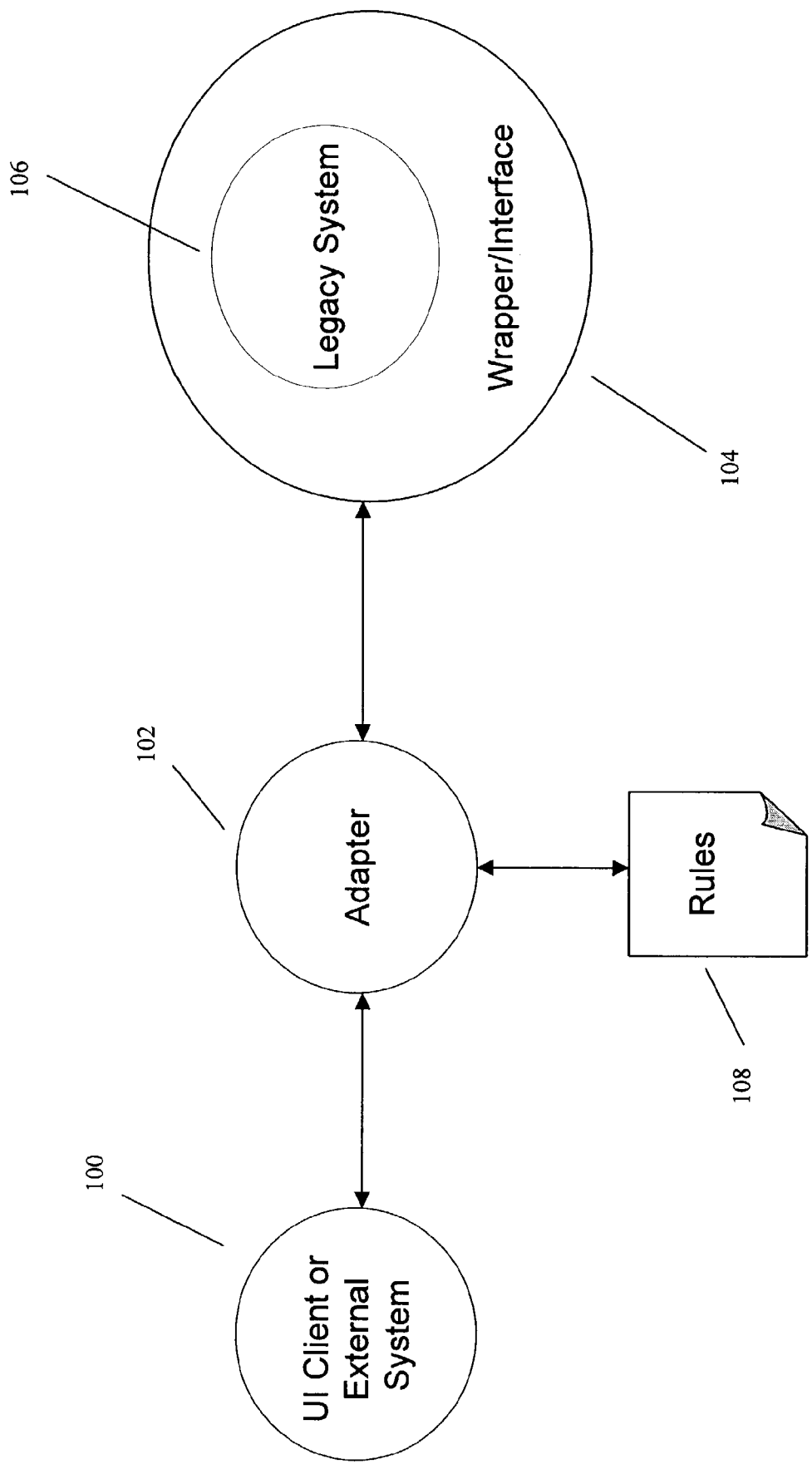
FIG. 1 is a block diagram illustrating interconnection with a legacy system in accordance with an exemplary embodiment of the present invention.

Preferred features of selected embodiments of this invention will now be described with reference to the figures. It will be appreciated that the spirit and scope of the invention is not limited to the embodiments selected for illustration. Also, it is contemplated that any of the configurations described hereafter can be modified within the scope of this invention.

In order to clarify certain aspects of the present invention, various definition of terms used herein are now defined.

A wrapper (or a wrapper interface) is code which is combined with another piece of code to determine how that code is executed. The wrapper acts as an interface between its caller and the wrapped code. This may be done for compatibility (e.g., if the wrapped code is in a different programming language or uses different calling conventions) or for security (e.g., to prevent the calling program from executing certain functions). The implication is that the wrapped code can only be accessed via the wrapper.

An API (i.e., application programming interface) is an interface (calling conventions) by which an application program accesses operating system and other services. An API is defined at source code level and provides a level of abstraction between the application and the kernel (or other privileged utilities) to ensure the portability of the code. An API can also provide an interface between a high level language and lower level utilities and services which were written without consideration for the calling conventions supported by compiled languages. In this case, the API's main task may be the translation of parameter lists from one format to another and the interpretation of call-by-value and call-by-reference arguments in one or both directions.

Business logic is the code that implements the functionality or business rules of an application.

A user interface refers to the aspects of a computer system or program which can be seen (or heard or otherwise perceived) by the human user, and the commands and mechanisms the user uses to control its operation and input data. A graphical user interface emphasizes the use of pictures for output and a pointing device such as a mouse for input and control whereas a command line interface requires the user to type textual commands and input at a keyboard and produces a single stream of text as output.

The present invention relates to applications and groups of applications whose business logic and user interface are "intermingled." As used herein, the term intermingled relates to a non-layered relationship between the business logic and user interface of an application.

Generally, the present invention relates to a method of separating the business logic from the user interface in applications of a legacy system. The invention preferably provides for such a method while minimizing changes to the legacy system code base. Additionally, in certain embodiments, the present invention provides multiple interfaces (and custom code) to the applications in the legacy system.

To separate the business logic from the user interface, the legacy system is wrapped with a new interface that models an end user. This artificial user hides the complexities of its task by providing the outside world with a set of simple methods to perform various functions including data entry, data retrieval, and error notification. The method utilizes the business logic from existing, unmodified, legacy system character code by emulating data entry, navigation, and error detection. As such, the business logic of the applications is exposed through the new interface, for example, as an API.

In an exemplary embodiment of the present invention, the legacy system is wrapped with a Java interface that renders a screen in HTML. Certain new features may be provided because of the HTML screen, for example, related to the changing the look & feel of screens, standardization of user navigation, and the ability to hide fields.

In another embodiment of the present invention, existing business logic of a legacy system is encapsulated such that a common gateway for multiple interfaces can be provided (e.g., HTML Interface, Hand-Held-Device Interface, API Interface, etc.).

As detailed herein, the present invention may be viewed as a group of components including a processing engine (e.g., including a Java interface or a Java wrapper), connection managers, and adapters.

According to an exemplary embodiment of the present invention, the processing engine emulates a user and thereby provides methods to interface with the underlying legacy system (e.g., MFG/PRO, SAP, etc.). Responsibilities of the processing engine may include, for example: launching of the legacy system session; maintaining the state of a session (i.e., busy, idle, disconnected); launching of applications/programs within the legacy system; retrieving data from a legacy system program; submission of data to a legacy system program; navigation of a legacy system program; error capturing and notification; and authentication of requests.

Although the processing engine (e.g., including a Java Interface) may have the responsibility to provide methods of communication with the legacy system, the processing engine is typically not responsible for controlling the flow in which these methods are called. As such, flexibility of different processing flows for different interfaces is provided. (i.e., HTML, hand held devices, APIs, etc.).

According to an exemplary embodiment of the present invention, data submitted to and from the processing engine is via XML, including non-critical error messages. (i.e., legacy system error & warning messages).

As described herein, connection managers provide a link between the legacy system interface (e.g., a Java Interface) and external adapters. The external adapter components provide a link between the outside world (e.g., a Web browser, a hand held device, etc.) and the internal system of the present invention.

FIG. 1 illustrates an exemplary interconnection with a legacy system. Legacy system 106 may be, for example, an ERP collection of applications and programs (e.g., SAP through Oracle, MFG/PRO through Progress, etc.). At least a portion of the applications included in legacy system 106 are intermingled, that is, the business logic and the user interface of a given application are intermingled. In order to access an application in legacy system 106 with an external device (e.g., an electronic messenger), or to provide a more robust user interface to an actual user, it is desirable to separate the business logic and the user interface of applications in legacy system 106.

In order to separate the business logic from the user interface, legacy system 106 is wrapped with wrapper/interface 104. For example, wrapper/interface 104 may be a Java interface. UI client/external system 100 desires to have an interaction (e.g., data entry, data retrieval, data update, etc.) with an application within legacy system 106. For example, UI client/external system 100 may be an actual user interface client (e.g., connecting through a web browser), or UI client/external system 100 may be an external system (e.g., an electronic messenger). UI client/external system 100 connects to adapter 102. Adapter 102 connects with wrapper/interface 104. Wrapper/interface 104 sends the desired information (e.g., connection information, data, instructions, etc.) to adapter 102. The desired information includes certain business logic of an application of legacy system 106 that is exposed to adapter 102 as an API. For example, the desired information may be sent to adapter 102 in XML format. Adapter 102 may be, for example, an HTML adapter that converts the desired information from a first format (e.g., XML) to a second format (e.g., HTML).

It also may be desirable to provide this desired information in a given layout and with particular attributes. As such, adapter 102 retrieves layout and format information from Rules 108 (e.g., XSL, style sheet, etc.) and combines this layout and format information with the desired information sent to adapter 102, for example, in XML format. The desired information is then formatted according to Rules 108 by adapter 102. The formatted information (e.g., in HTML format) is then sent to UI client/external system 100.

Figure 2:
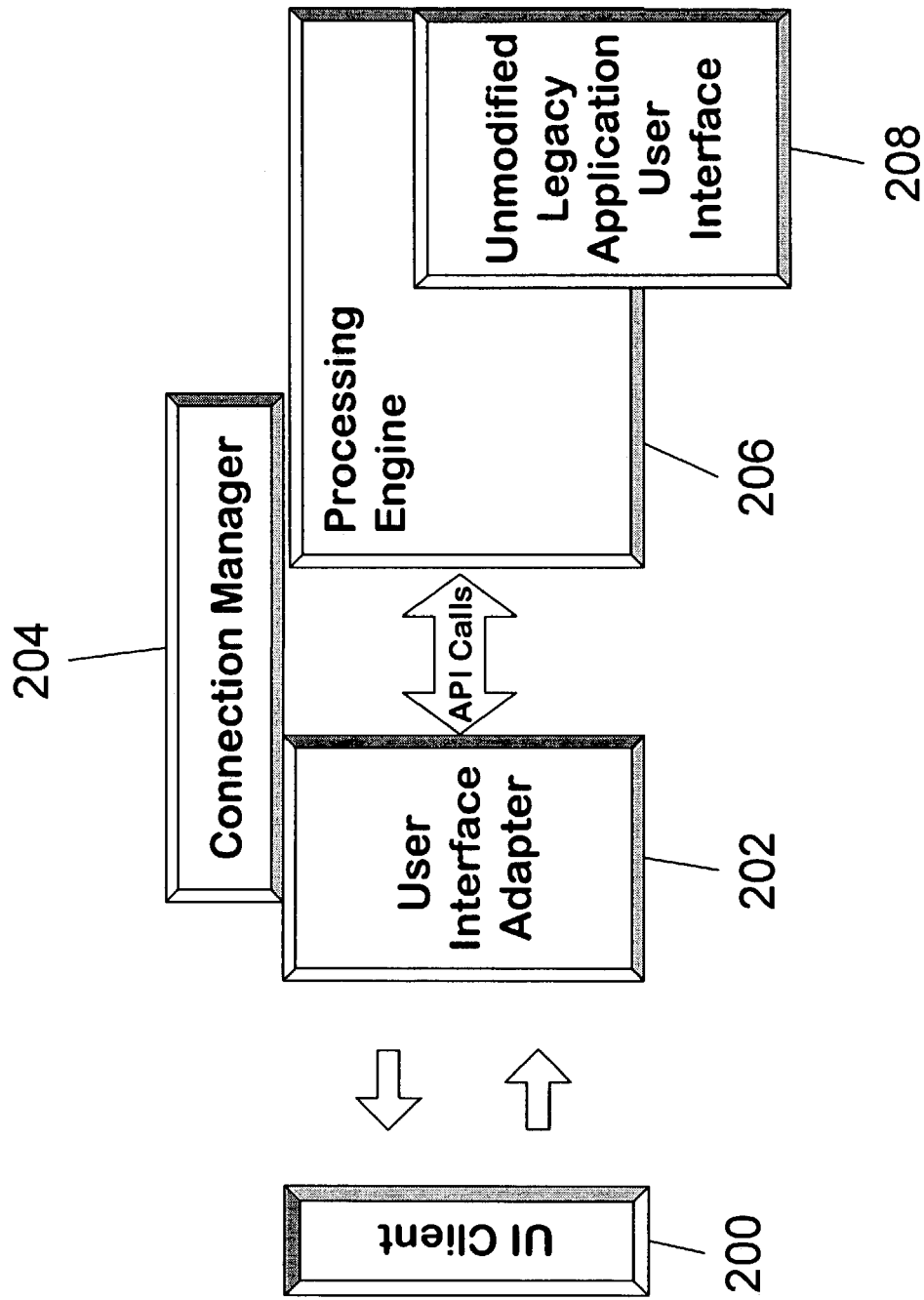
FIG. 2 is a block diagram illustrating interconnection between a legacy system and a user interface client in accordance with an exemplary embodiment of the present invention.

FIG. 2 illustrates the interaction of components of a user interface client implementation of an exemplary embodiment of the present invention. In the embodiment illustrated in FIG. 2, a user, through UI client 200 (i.e., user interface client 200), desires to conduct an interaction with an application within unmodified legacy application user interface 208. UI Client 200 may be any device or software that is able to render a functional user interface to a user.

UI Client 200 may have some combination of the following exemplary responsibilities: render a functional user interface compatible with a display device (e.g., PDA, browser, hand held terminal, mobile phone, etc.); provide a mechanism for the user to enter data; provide a mechanism for the entered data to be submitted to a user interface adapter component (e.g., HTTP post for browsers, socket to socket call, native program call (i.e., Java-to-Java), web-services, etc.); provide a mechanism to store an identity reference to the allocated instance of the processing engine; provide a mechanism for the user interface to display error/information messages; provide a representation for the user of functions like submit, go back, delete, insert, etc.; and to provide a mechanism for the user interface to be closed.

UI Client 200 makes requests from user interface adapter 202. User interface adapter 202 interprets the requests from UI Client 200, and formulates appropriate responses. User interface adapter 202 also makes requests and handles responses (e.g., API calls) to and from processing engine 206.

User interface adapter 202 may have some combination of the following exemplary responsibilities: interpret requests from UI client 200; basic validation of a request from UI client 200; convert a request from UI Client 200 into something recognizable by processing engine 206; re-match the client request with the original allocated processing engine 206 (via connection manager 204—not for initial requests and when a pool is being used); provide the ability to launch new programs; control the process flow of API calls made to processing engine 206 (e.g., submit data and then get the screen, etc.); handle errors; formulate responses from processing engine into a format recognizable by UI client 200 (e.g., HTML, WML, etc.); and ensure UI client 200 and adapter integrity (i.e., no duplicate submits, recovery from system failures, etc.).

Connection manager 204 holds a pool of sessions for processing engine 206. Though the system could operate by creating a new processing engine 206 for every new program request, this could be inefficient. This is particularly true if there is an overhead in starting up the legacy application. Therefore, using connection manager 204 may provide for re-use of processing engine 206.

Connection manager 204 may have some combination of the following exemplary responsibilities: start and stop a pool of processing engines 206 (wrapping the legacy application); maintain a state for each individual processing engine 206 (e.g., idle, busy, initializing, disconnected, etc.); maintain the transition of the states; provide a mechanism to obtain an idle processing engine 206; provide a mechanism to obtain a busy processing engine 206 using an identity; provide a mechanism for timing out a busy session when inactive for a period of time; perform house keeping on the pool (i.e., clear up disconnected processing engines 206), timeouts, etc.; and maintenance and management of an individual processing engine (i.e., ending, re-setting, etc.).

Processing engine 206 exposes a set of APIs into a legacy application, where the business logic of the given application is intermingled with the user interface. This provides the outside world the illusion of dealing directly with the business logic of the legacy application.

Processing engine 206 may have some combination of the following exemplary responsibilities: wrap the underlying legacy application with an API layer; expose a set of generic APIs that can represent all possible actions required by the legacy system (e.g., start program, stop program, submit data, get errors, get display (screen), get field, etc.); interact with the legacy application without (where possible) making any modifications to the existing code, for example using a hidden user interface (e.g., using a character interface like Telnet, DOS window, or other types of client interface); provide a veneer over the legacy application (possibly written in the legacy application code) that understands requests from processing engine 206 (this may be used for generating a data representation of the legacy system user interface, providing confirmations of processing engine 206 requests and so forth); maintain the integrity of the legacy application (e.g., ensure transactions are completed, error detection and recovery, processing timeouts, legacy application termination (graceful and forced)); maintain the state of the legacy application (e.g., idle, busy, initializing, etc.); provide a mechanism for generating a structured data representation of the screen including identities for data entry points (e.g., field names); provide a mechanism for taking submitted data and cross referencing data points with their respective identities in the legacy application (e.g., matching the data submitted with the corresponding legacy application field); provide a transformation of data type formats (e.g., date format, time format, Boolean (true/false or yes/no), etc.) between the legacy application and the submitted data (e.g., dd/mm/yy converted to mm/dd/yy); provide a mechanism for capturing errors from the legacy application; support multiple legacy application data entry types (e.g., fill-in, combo-box, radio-set, selection lists, etc.); allow the data flow of the legacy application to drive the data entry process (e.g., only send data to the legacy application when asked, don't submit a batch of fields at once); provide a mechanism to control or default navigation through the legacy application user interface (hiding this fact from the outside world) (e.g., hit return for every field, etc.); and ensure that a processing sequence tag generated for screen data is validated against the submitted data before sending the data into the legacy system (e.g., ensure legacy systems and client submitted data is not out of sink).

Unmodified legacy application user interface 208 is the user interface of an application in the underlying legacy system where the business logic and user interface of the application are intermingled.

Although one single UI client 200 has been illustrated and described by reference to FIG. 2, it is intended that multiple UI clients 200 may have interactions with the legacy system at the same time.

Figure 3:
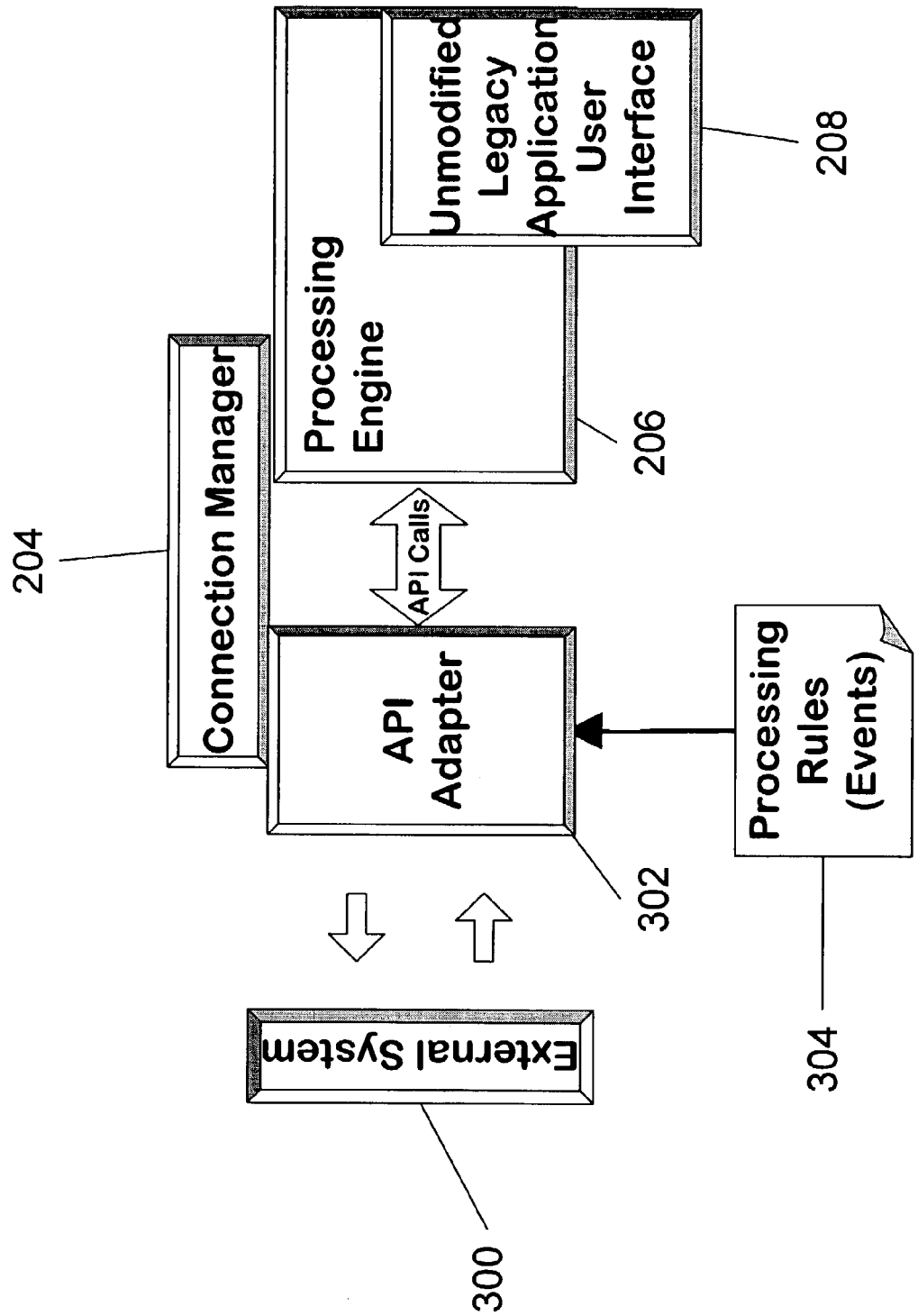
FIG. 3 is a block diagram illustrating interconnection between a legacy system and an external system in accordance with an exemplary embodiment of the present invention.

FIG. 3 illustrates the interaction of components of an external system implementation of an exemplary embodiment of the present invention. In the embodiment illustrated in FIG. 3, it is desired to conduct an interaction with an application within the legacy system through unmodified legacy application user interface 208 using external system 300. For example, external system 300 may be a system that interacts with the legacy system via electronic messaging. External system 300 may be defined as any conceivable component that is able to make a programmatic request to API adapter 302 and that may pass API adapter 302 a data message (i.e., user less system or headless).

In a modified version of the exemplary embodiment illustrated in FIG. 3, the interface that API adapter 302 exposes to external system 300 is fixed. In such an embodiment, some other component, ahead of external system 300, is used to translate. External system 300 may be, for example, a messaging system (JMS), a mail client (SMTP), EDI (Electronic Data Interchange messages), a native language call (i.e., Java to Java), data files, web-services (SOAP over HTTP), HTTP tunneling, XML messaging, etc.

API adapter 302 interprets requests from, and formulates responses to, external system 300. API adapter 302 also makes requests and handles responses to and from processing engine 206.

API adapter 302 may have some combination of the following exemplary responsibilities: interpret requests from external system 300; basic validation of a request from external system 300; identify the identity of a request from external system 300 and obtain the correct legacy program to run the identified request; convert a request from external system 300 into a format that is recognizable by processing engine 206; obtain an idle processing engine 206 (e.g., through a connection manager); control the process flow of API calls made to the processing engine 206 (e.g., get field then submit data, etc.); handle errors; formulate responses from processing engine 206 into a format that is recognizable by external system 300 (as defined in the specific external system component) (e.g., XML, SOAP responses, SMTP, etc.); ensure external system 300 and adapter integrity (i.e., recovery from system/connection failures, etc.); use the processing rules to control the entry of data from an electronic message into the legacy system; maintain a position of reference within an electronic message relevant to the processing stage of the legacy system; and use the processing rules to replace any decisions that a physical user would have made if a physical user was processing the message through a user interface.

API adapter 302 works with processing rules 304 in order to make decisions that would be made by an actual physical user if the session utilized an actual physical user interface. Processing rules (events) 304 provide a method of representing key processing stages within the legacy application to replace the decision a user would have made. For example, such processing stages include when to delete data, the submission of data, iterative block in the legacy application, how iterative blocks in the legacy application correlate against the electronic message, and alternate navigation.

Processing rules 304 may have some combination of the following exemplary responsibilities: control the whole process interaction between the legacy application (including unmodified legacy application user interface 208) and processing engine 206; emulate the decisions a user would have made when going through a user interface; cross reference iterative sections of a legacy application with the corresponding representation in the electronic message; and maintain a default set of rules across the system (i.e., submit data on every field).

Connection manager 204, processing engine 206, and unmodified legacy application user interface 208 have similar functionality as described above with respect to FIG. 2.

Although one single external system 300 has been illustrated and described by reference to FIG. 3, it is intended that multiple external system devices 300 may have interactions with the legacy system at the same time.

Figure 4:
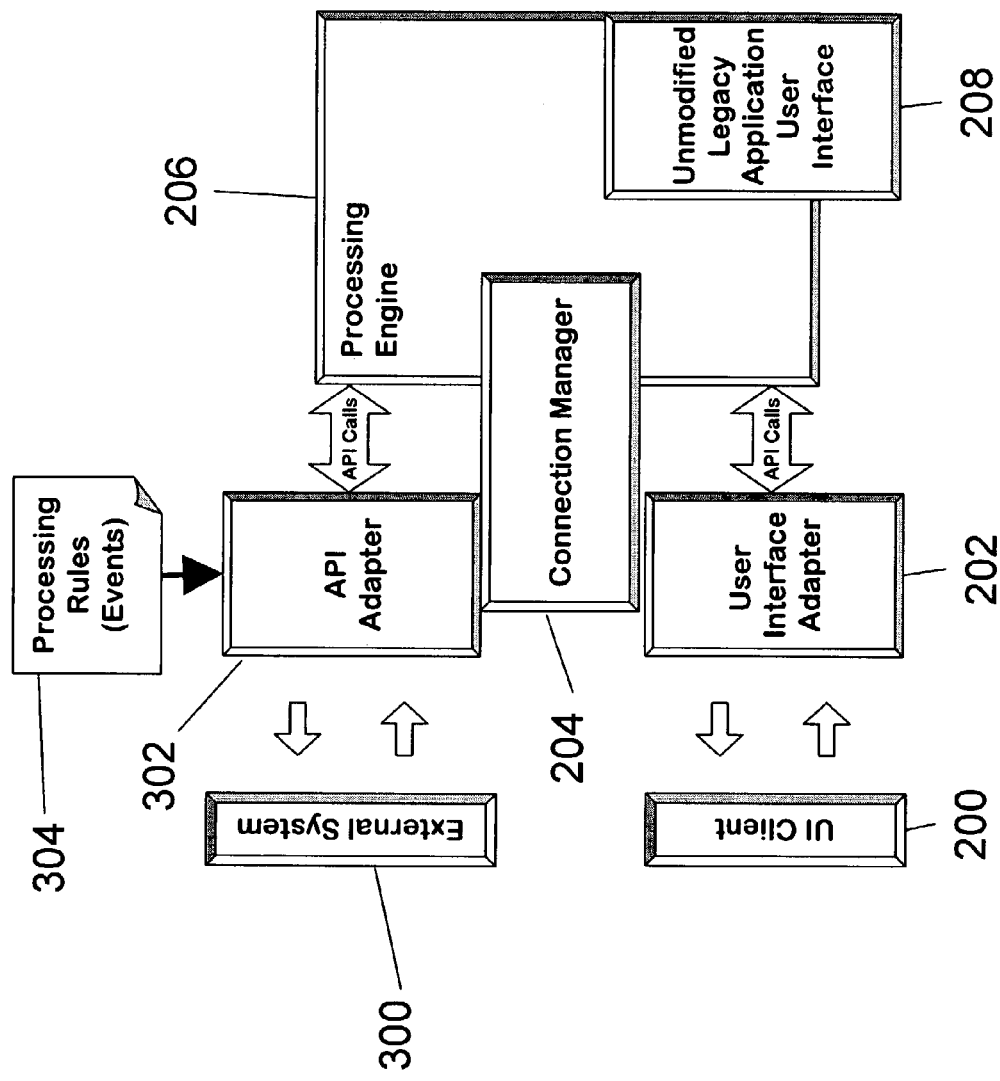
FIG. 4 is a block diagram illustrating interconnection between a legacy system and both a user interface client and an external system in accordance with an exemplary embodiment of the present invention.

FIG. 4 illustrates another exemplary embodiment of the present invention in which interactions with an underlying legacy system are conducted by a user through a user interface (e.g., UI client 200), and also by an external system 300. Each of the components illustrated in FIG. 4 has similar functionality to the same component as described above with respect to FIGS. 2-3. Further, as with the embodiments illustrated in FIGS. 2-3, it is intended that multiple UI clients 200 and multiple external system devices 300 may have interactions with the legacy system at the same time.

Figure 5:
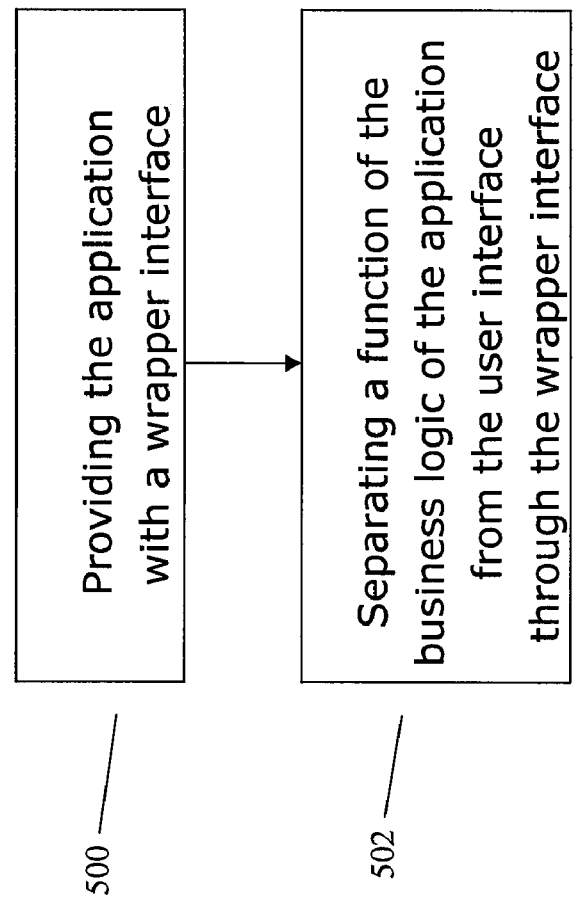
FIG. 5 is a flow diagram illustrating a method of separating business logic of an application from a user interface of the application in accordance with an exemplary embodiment of the present invention.

FIG. 5 is a flow diagram illustrating an exemplary method of separating business logic of an application from a user interface of the application when the business logic and user interface of the application are intermingled. At step 500, the application is wrapped with a wrapper interface (e.g., a Java interface). At step 502, the business logic of the application is exposed as an API. For example, the business logic is exposed as an API to provide for interactions with either of a UI client or an external system.

Figure 6:
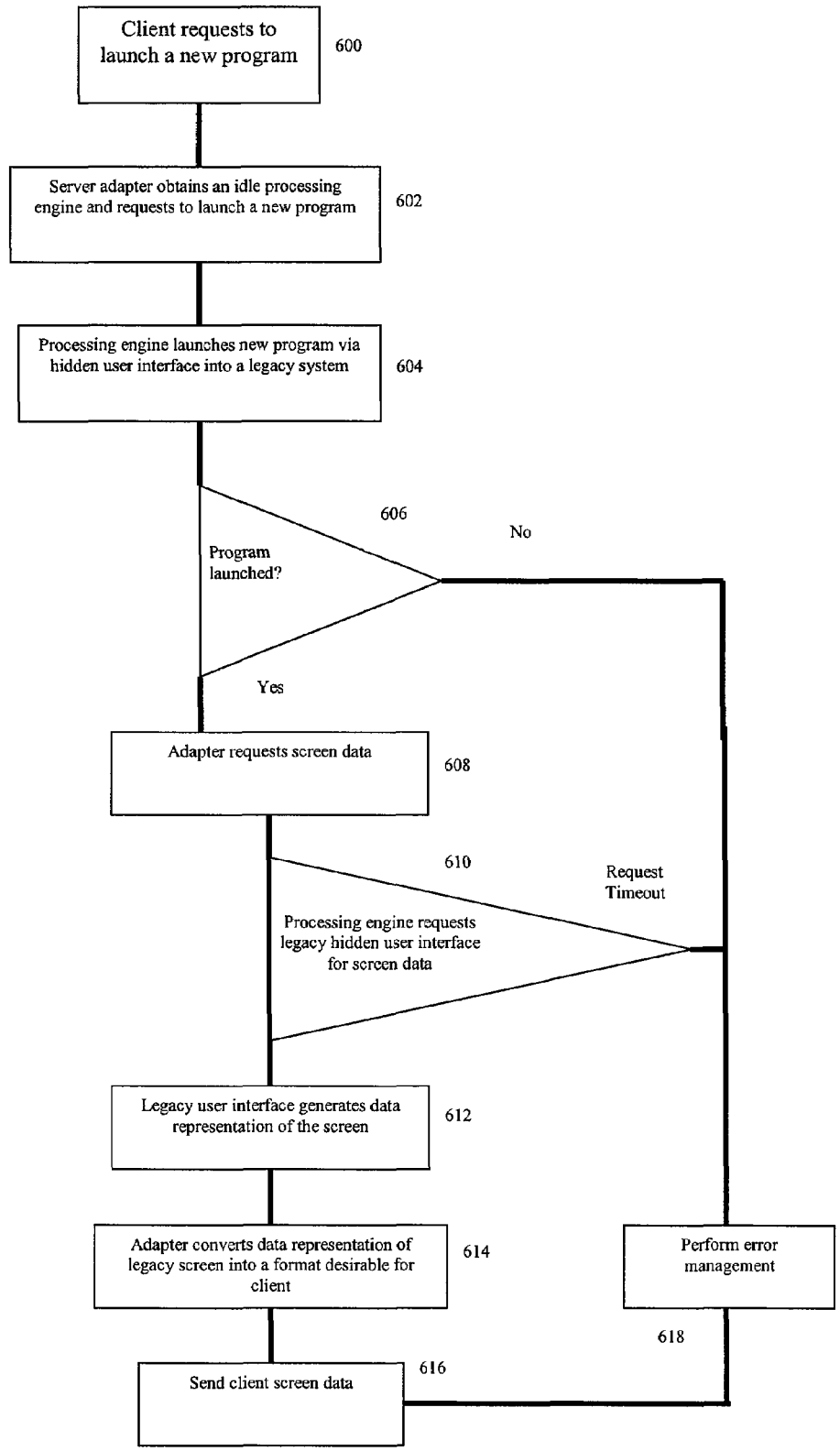
FIG. 6 is a flow diagram illustrating a process of launching an application in accordance with an exemplary embodiment of the present invention.
Figure 7:
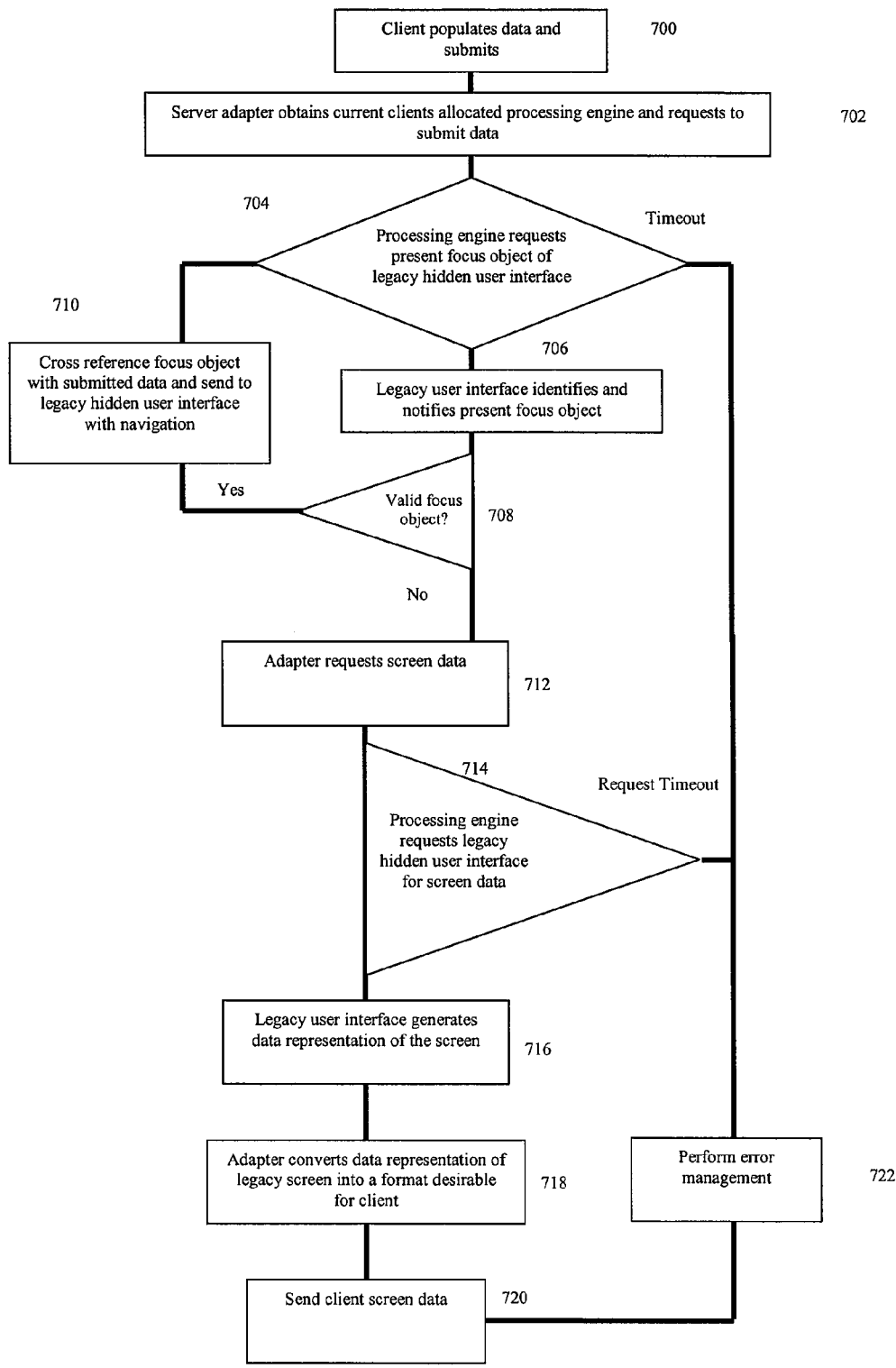
FIG. 7 is a flow diagram illustrating a data submission process through a wrapper interface in accordance with an exemplary embodiment of the present invention.
Figure 8:
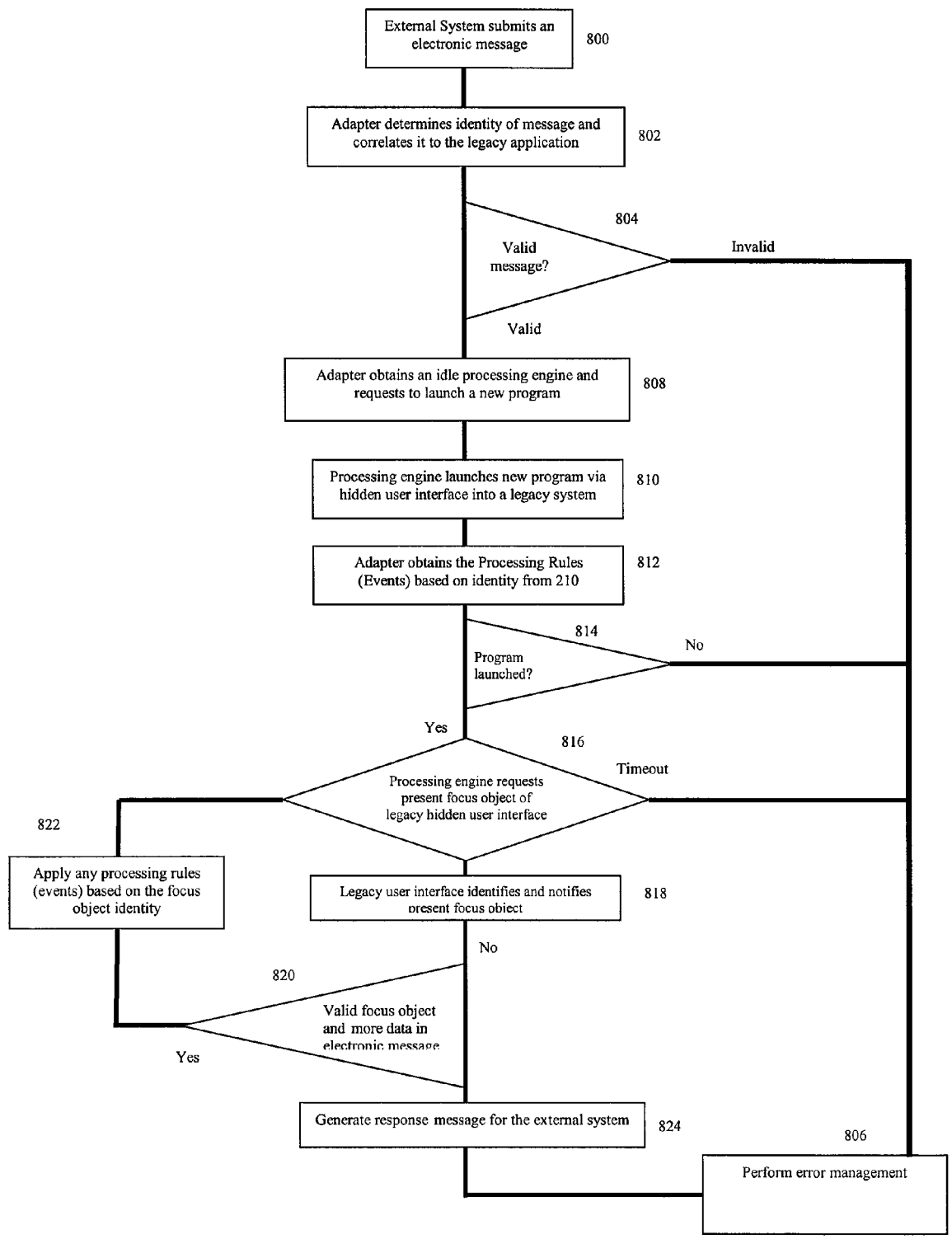
FIG. 8 is a flow diagram illustrating electronic message submission from an external system in accordance with an exemplary embodiment of the present invention.

FIG. 6-8 are flow diagrams illustrating exemplary process flows related to wrapping applications whose programming logic consists of an intermingled user interface and business logic, thereby giving the illusion that the business logic and user interface are clearly separated. Stated another way, FIGS. 6-8 relate to a method of representing an application whose programming logic consists of intermingled model view controller pattern (MVC) to give the illusion that these are clearly separated.

More specifically, FIG. 6 relates to launching a new program/application within a legacy system, where the program/application has been wrapped to partition the business logic and user interface of the program/application.

At step 600, a client requests to launch a new program in the legacy system. For example, the program may be a Progress based application in MFG/PRO. The client can be any device or software that is able to render a user interface, such as a web-browser, a mobile phone, a hand held terminal, a PDA, etc. The client request includes a method of identifying the program with which to launch from the legacy system. For example, this method may relate to a program name, description, etc.

At step 602, a server adapter obtains an idle processing engine and makes a request to launch the new program. The server adapter interprets the requests from the client based on the particular client server protocol being used. For example, such protocols could be HTTP/HTML (web-browsers, hand held terminals, PDA's), WML (mobile phones), XML, etc.

In obtaining an idle processing engine, it may be desirable to pre-start the legacy application and hold numerous idle sessions in a pool to improve performance. Therefore, at step 602, the server adapter would either start a new processing engine (which starts the legacy system) or would obtain an idle processing engine from a pool of pre-started systems. After an idle session is obtained, a request is made to the processing engine to launch a new program.

At step 604, the obtained processing engine launches the new program via a hidden user interface into the legacy system. In order to interact with the core of an unmodified legacy application it is desirable to access functionality via a programmatically hidden user interface. For example, the programmatically hidden user interface could be based in Telnet, DOS window, or any other type of client interface. The underlying legacy application may also require minor modification in order to process requests from the processing engine. An exemplary method of sending a request from the processing engine utilizes a character sequence (or a trigger).

According to an exemplary embodiment of the present invention, the processing engine sends a request that is recognizable by the hidden user interface to launch the desired program. Once the task of launching the desired program is complete, the hidden user interface notifies the processing engine of its status. Exemplary methods for performing the response from the hidden user interface could utilize control character sequences, messages, reading specific information from the hidden user interface, or any other protocol available to link the processing engine and the hidden user interface.

At step 606, a determination is made as to whether a response indicating that the program has been launched has been received. More specifically, to maintain the integrity of the processing engine and hidden user interface, every request has an expected response. If the desired response (indicating that the program has launched) is not received within a give period of time (i.e., a timeout period), the processing engine performs error management at step 618.

The error management at step 618 is only encountered if some unexpected eventuality has occurred within the processing engine or the hidden user interface. It is a responsibility of step 618 to ensure the integrity of the underlying legacy application and also to notify the calling system that an error has occurred.

Exemplary actions at step 618 include reversing transactions within the legacy application (e.g., via a reset command through the hidden user interface), exiting the hidden user interface, and providing a notification to all callers of the processing engine that an error has occurred.

If it is determined at step 606 that the program has launched, the server adapter requests appropriate screen data at step 608. The request from the server adapter for the screen data is a request to the processing engine. This request could be in any structured form that can represent a screen. For example, appropriate types of structured data include XML, SVG (a sub-set of XML), objects, relational tables, etc.

Exemplary types of data that could be obtained from the screen data could be: field names; labels; field values; datatypes; formatting; screen coordinates; mandatory data; colors; size; display type (i.e., toggle-box, selection list, drop down list, etc.); and so forth.

At step 610 the processing engine requests screen data for the legacy hidden user interface. The processing engine sends this request to the hidden user interface similarly to the launch described above at step 604. During step 610, if the predetermined process timeout period (i.e., no response is received from the hidden user interface) elapses, error management is performed at step 618. The error management performed is similar to the error management described above that resulted from a negative response at step 606.

At step 612, the legacy user interface generates a data representation of the screen. More specifically, upon receiving a request from the processing engine, via one of the exemplary methods described above with respect to step 604, a modified piece of code will be invoked on the legacy system which generates a data representation of the screen in a format as requested in step 608. Exemplary methods for obtaining the screen data from the legacy application may be to perform a memory walk of the screen handles, scan the runtime object code, or any other programmatic method available (dependent on the underlying programming language used).

Once the data representation of the screen is complete the structured data is transferred to the processing engine. Exemplary methods of data transfer may be via the exiting user interface, direct socket to socket connect (i.e., a point to point connection), writing to file, and so forth.

At step 614, the server adapter converts the data representation of the legacy screen into a format that is desirable to the client. More specifically, based on a predefined set of rules, the screen data structured object is converted into a format desirable to the client. The conversion process is dictated, for example, by the methods by which the screen data is stored and the type of client. Exemplary methods for performing the conversion could be XSLT (eXtensible Stylesheet Language-Transformations), programmatic conversion, etc.

At step 616, the screen data is sent to the client. More specifically, based on the original request and client type from step 600, the resultant new screen is sent to the client. The look and feel of the new client screen may look vastly different to the user of the legacy system user interface.

After completing the launch of a new program/application of the legacy system as illustrated in FIG. 6, it may be desirable to perform any of a number of interactions with the legacy system. FIG. 7 illustrates an exemplary interaction process flow with the legacy system relating to submitting and/or updating data included in the legacy system through the wrapper interface once an application has been launched.

At step 700, the client populates the user interface with data and submits the populated user interface. As with the exemplary process illustrated in FIG. 6, the client can be any device or software that is able to render a user interface, such as a web-browser, a mobile phone, a hand held terminal, a PDA, etc.

The client, having populated the user interface with data, submits the data to the server adapter. For example, the data includes a cross-reference to the corresponding data objects within the legacy system.

At step 702, the server adapter obtains the current clients allocated processing engine and requests to submit data. The server adapter converts the submitted data into a form that is compatible with the processing engine. For example, this format could be XML, data objects, relational tables, etc.

If the legacy system requires a stateful connection (i.e., a connection that remains active between stateless user requests), then the server adapter retrieves from a connection manager the present allocated processing engine. This may be accomplished, for example, by utilizing session references, unique keys, etc. Once a valid processing engine is obtained by the server adapter, the server adapter makes the request to submit data.

At step 704, the processing engine obtained by the server adapter requests the present focus object of the legacy hidden user interface. More specifically, the processing engine sends a request to the legacy application via the hidden user interface for the present focus object. This process is similar to the process described above with respect to step 604 of FIG. 6. For example, the present focus object may be a data field, a button, a radio-button, a selection list, a check box, a drop down list, etc.

During step 704, if the predetermined timeout period elapses, error management will be performed at step 722. The error management at step 722 is only encountered if some unexpected eventuality has occurred within the processing engine or hidden user interface. As described above, the error management is performed to ensure the integrity of the underlying legacy application, and also to notify the calling system that an error has occurred. Exemplary actions at step 722 include reversing transactions within the legacy application (e.g., via a reset command through the hidden user interface), exiting the hidden user interface, and providing a notification to all callers of the processing engine that an error has occurred.

Assuming a timeout has not altered the process flow to the error management at step 722, the legacy user interface identifies and notifies the present focus object at step 706. More specifically, upon receiving a request from the processing engine, via one of the methods described above with respect to step 604 of FIG. 6, a modified piece of code will be invoked on the legacy system which will identify the present focus object.

Once the focus object has been identified, a notification to the processing engine is performed. For example, the processing engine notification may be accomplished using one of the exemplary methods described above by reference to step 612 of FIG. 6.

At step 708, a determination is made as to whether the identified focus object is valid. The system will repeat around this step until an invalid focus object is identified. Exemplary events that would result in the identification of an invalid focus object are: new focus objects that were not enabled as part of the last screen data request; focus objects encountered twice; unrecognized/unknown focus object; etc.

If it is determined that the identified focus object is valid at step 708, the focus object is cross referenced with submitted data and sent to the legacy hidden user interface with navigation. More specifically, using the identifier provided by step 700, a cross reference against the focus object and the submitted data is made. If an updated value is found, the value is sent down into the user interface (using normal key action commands). Any transformation of data may also be performed at this step (e.g., date transformation from dd/mm/yyyy to mm/dd/yy).

Along with the cross referenced submitted data, the corresponding navigation that is utilized to move the legacy application onward is also sent to the user interface. For example, the correct navigation could be obtained from the legacy application (e.g., as part of step 706), the focus object type list, the general focus object type rules, etc.

If it is determined at step 708 that the focus object is invalid, the server adapter requests screen data at step 712. The request from the server adapter for the screen data is a request to the processing engine. This request could be in any structured form that can represent a screen. As indicated above, exemplary types of structured data include XML, SVG (subset of XML), objects, relational tables, etc. As above, exemplary types of data that could be obtained from the screen data include: field names; labels; field values; data-types; formatting; screen coordinates; mandatory data; colors; size; display type (i.e., toggle-box, selection list, drop down list, etc.); and so forth.

At step 714, the processing engine requests screen data for the legacy hidden user interface. The processing engine sends this request to the hidden user interface similarly to the launch described above with respect to step 604 of FIG. 6. During step 714, if the predetermined process timeout period (i.e., no response is received from the hidden user interface) elapses, error management is performed at step 722.

At step 716, the legacy user interface generates a data representation of the screen. That is, upon receiving a request from the processing engine, via one of the exemplary methods described above with respect to step 604 of FIG. 6, a modified piece of code will be invoked on the legacy system which generates a data representation of the screen in a format as requested in step 608 of FIG. 6. Exemplary methods for obtaining the screen data from the legacy application may be to perform a memory walk of the screen handles, scan the runtime object code, or any other programmatic method available (dependent on the underlying programming language used). Once the data representation of the screen is complete the structured data is transferred to the processing engine. Exemplary methods of data transfer may be via the exiting user interface, direct socket to socket connect (point to point connection), writing to file, and so forth.

At step 718, the server adapter converts the data representation of the legacy screen into a format desirable for the client. More specifically, based on a predefined set of rules, the screen data structured object is converted into a format desirable to the client. The conversion process is dictated, for example, by the methods by which the screen data is stored and the type of client. Exemplary methods for performing the conversion could be, XSLT (extensible Stylesheet Language-Transformations), programmatic conversion, etc.

At step 720, the screen data is sent to the client. More specifically, based on the original request and client type from step 700, the resultant new screen is sent to the client. The look and feel of the new client screen may look vastly different to the user of the legacy system user interface.

Although the interaction described with respect to FIG. 7, between the user interface and the wrapped legacy system, related to the submission and update of data in the legacy system, these are only exemplary interactions. Any interactions conducted between the user interface and the wrapped legacy system are within the scope of this embodiment of the present invention. For example, the interaction may relate to data entry, data retrieval, data update, data removal, error notification, and data contention between the business logic of the application and a user of the application.

The processes described by reference to FIGS. 6-7 relate to interactions between a user interface and the wrapped legacy system; however, it may also be desirable to have interactions between an external system and the wrapped legacy system. For example, the external system may be a messaging system (JMS), a mail client (SMTP), an EDI (Electronic Data Interchange messages), a native language call (i.e., Java to Java), data files, web-services (SOAP over HTTP), HTTP tunneling, XML messaging, etc.

FIG. 8 illustrates the process flow for submitting an electronic message from an external system to the wrapped legacy system. At step 800, the external system submits an electronic message. Again, the external system could be defined as any conceivable component that is able to make a programmatic request to the API adapter component, and that is able to pass it a data message. Using any of the exemplary external components listed above (or a non-listed external component), the external system submits an electronic message to the API adapter. The electronic message sent by the external system may be formatted in, for example, XML, EDI, fixed length file, etc.

At step 802, the server adapter determines the identity of the message and correlates the identity of the message to the legacy application (or a portion of a legacy application in the legacy system). For example, the identity of the electronic message may include at least one of a name of the message and a version number of the message. The server adapter provides a mechanism for accepting electronic messages from an external system. Such methods of accepting messages could be in the form of web-services, HTTP tunneling, SMTP, JMS, etc.

The server adapter interprets the electronic message (which could be in XML, EDI, etc.) and determines the identity of the message. This identity is used to cross-reference the legacy application that the message will be processed against. The identity of the message may also be used to ensure the particular request is permitted on this system (for purposes of security). As such, the rules for conducting am interaction between the application within the legacy system and the electronic message are determined based on the identity of the electronic message.

At step 804, a determination is made as to whether the electronic message is a valid message. The electronic message is validated to ensure its structure conforms to a predetermined structure. For example, validation techniques include versioning, XML schema validation, XML DTD validation, check sums, etc.

If it is determined that the electronic message is invalid at step 804, the request is rejected and sent to error management at step 806. Step 806 is only encountered if some unexpected eventuality has occurred within the processing engine or hidden user interface. It is the responsibility of step 806 to ensure the integrity of the underlying legacy application, and also to notify the calling system that an error has occurred.

Exemplary actions at step 806 include reversing transactions within the legacy application (e.g., via reset command through the hidden user interface), exiting the hidden user interface, and providing a notification to all callers of the processing engine that an error has occurred. Additionally, a corresponding error electronic message is generated at step 806.

If it is determined that the electronic message is valid at step 804, the server adapter obtains an idle processing engine and requests to launch a new program at step 808. More specifically, it may be desirable to pre-start the legacy application and hold idle sessions in a pool to improve performance. Therefore, at step 808, the server adapter either starts a new processing engine (which starts the legacy system) or obtains an idle processing engine from a pool of pre-started systems.

Once an idle processing engine session is obtained by the server adapter, a request to the processing engine to launch a new program is made at step 810. The processing engine launches the new program via a hidden user interface into the legacy system. In order to interact with the core of an unmodified legacy application it is desirable to access functionality via a programmatically hidden user interface. Examples of interfaces that provide this functionality include Telnet, DOS window, or other types of client interface. The underlying legacy application may also require minor modifications in order to process requests from the processing engine. An exemplary method for sending a request may be a character sequence (or trigger).

In order to launch the desired program, the processing engine sends a request that is recognizable by the hidden user interface. Once the launching task is complete, the hidden user interface notifies the processing engine of its status. Exemplary methods for performing such status notification responses include formats such as control character sequences, messages, reading specific information from the hidden user interface, or any other protocol available to link the processing engine and the hidden user interface.

At step 812, the server adapter obtains the process rules (events) based on an identity obtained at step 802. The processing rules (events) relate to a method of representing key processing stages within the legacy application to replace the decision a user would have made if the interaction included a user interface. For example, such processing stages include: when data can be deleted, submitting data, iterative blocking in the legacy application, correlating the iterative block against the electronic message, and alternate navigation.

At step 814, a determination is made as to whether the program has been launched. In order to maintain the integrity of the processing engine and the hidden user interface, every request typically has an expected response.

If it is determined that the program has not been launched at step 814, or if the desired response is not received within a predetermined period of time (i.e., a timeout period), the processing engine performs error management at step 806.

If it is determined that the program has been launched at step 814, the processing engine requests the present focus object of the legacy hidden user interface at step 816. More specifically, the processing engine sends a request to the legacy application via the hidden user interface for the present focus object. This process is similar to that described above with respect to 810. Exemplary present focus objects include a data field, a button, a radio-button, a selection list, a check box, a drop down list, etc.

At step 818, the legacy user interface identifies the present focus object and notifies the processing engine. More specifically, upon receiving a request from the processing engine (via one of the methods described above by reference to step 600 of FIG. 6), a modified piece of code will be invoked on the legacy system which will identify the present focus object. Once the focus object has been identified a notification to the processing engine is performed (e.g., using one of the exemplary methods described above with respect to step 810).

At step 820, a determination is made as to whether the focus object is valid and, and also to determine if more data is available to process in the electronic message. The system will repeat around this step until an invalid focus object is identified or until there is no further data available to process in the electronic message. Exemplary events that may result in an invalid focus object are: focus objects encountered twice, unrecognized/unknown focus object, etc.

If it is determined that the focus object is valid at step 820, or if it is determined that there is additional data to process in the electronic message, processing rules (events) are applied based on the focus object identity at step 822. More specifically, using the focus object identity, a cross-reference is made against the processing rules. Exemplary processing rules (events) that may be performed at step 822 include: start iteration, submit data, request delete, alternate navigation, update data, or any possible action required to process data into the underlying legacy application.

The processing rules can be defined with defaults, for example, every focus object in the legacy application could require a send data event. Exemplary types of controlling events include, for example, an iteration event and a send data event. An iteration event is a type of event that mirrors iterative data sets within the legacy application. This is used to maintain a reference of where to obtain the respective data from in the electronic message. A send data event is used to take data from the electronic message, reformat the data (where necessary), and submit the data to the legacy application along with navigation. Typically, events may be viewed as being similar to a scripting tool for the legacy application.

If it is determined that the focus object is invalid at step 820, or if it is determined that there is no additional data to process in the electronic message, a response message is generated for the external system at step 310. Depending upon the method by which the external system interacts with the server adapter, the response message may be generated to indicate either of success or failure. Exemplary response message types include XML, SOAP, HTTP, echo of original message, etc.

Types of information that could be of importance in a response message are, turnaround data (key values from original message, transaction ids, trading partner id, etc), error messages, the relationship between an error message and the original message, success/failure, information messages, and processing information (e.g., time, date, processing time, etc.).

The various exemplary embodiments of the present invention may also be implemented through a computer readable carrier including computer program instructions which cause a computer to implement the method of separating business logic of an application from a user interface of the application, where the business logic and user interface of the application are intermingled. For example, the computer readable carrier may comprise a packaged silicon device, a solid state memory, an optical disc, a magnetic disc, a radio frequency carrier wave, and an audio frequency carrier wave.

Although this invention has been described with reference to interactions with applications/programs within a legacy system, it is not limited thereto. The present invention is applicable to any application where the business logic and user interface are intermingled.

It will be appreciated that other modifications can be made to the illustrated embodiments without departing from the scope of this invention, which is separately defined in the appended claims.

What is claimed:

1. A method of establishing a new user interface, the method comprising the steps of:
    separating, using a wrapper interface, a function of business logic of an application from an intermingled user interface of the application;
    hiding the intermingled user interface;
    establishing a new user interface to a user such that the separated function of the business logic of the application is exposed to the user using the wrapper interface, wherein the step of establishing the new user interface includes sending a request, by a processing engine of the wrapper interface, to the intermingled user interface using the new user interface and verifying a response to the request sent by the processing engine;
    emulating, by a rule processor using predetermined rules, interactions of the user; and
    transforming, under the control of the rule processor, a request provided through the new user interface and the emulated interactions of the user to provide a transformed request, as the request sent by the processing engine to the intermingled user interface for processing by the intermingled user interface.

2. The method of claim 1, wherein the step of providing a wrapper interface includes wrapping the application with a Java interface.

3. The method of claim 1, wherein the step of establishing the new user interface includes interacting, by the user, with the business logic of the application through the new user interface.

4. The method of claim 3, wherein the step of establishing the new user interface includes providing the new user interface as an HTML interface.

5. The method of claim 1, further comprising the step of:
    providing an XML representation of at least a portion of the intermingled user interface from the application to a resource.

6. The method of claim 5, further comprising the step of:
    converting the XML representation of the portion of the intermingled user interface to an HTML representation using the resource and a style sheet defining the HTML representation.

7. The method of claim 6, further comprising the step of:
    providing the HTML representation to the user through a web browser.

8. The method of claim 1, further comprising the step of:
    processing an interaction between the business logic of the application and the user of the application.

9. The method of the claim 8, wherein the step of processing includes at least one of processing a data entry, a data retrieval, a data update, a data removal, an error notification, or a data contention between the business logic of the application and the user of the application.

10. The method of claim 1, further comprising wrapping, by the wrapper interface, each of a plurality of applications included in an enterprise resource planning application.

11. The method of claim 1, wherein the step of separating the function of business logic of an application includes providing the business logic of the application as an API separated from the intermingled user interface of the application.

12. The method of claim 11, further comprising the step of:
    receiving, at the API, an electronic message related to an interaction between the application and an electronic message sender.

13. The method of claim 12, wherein the step of receiving includes receiving, at the API, an XML based electronic message related to the interaction between the application and the electronic message sender.

14. The method of claim 12, further comprising the steps of:
    determining an identity of the electronic message; and
    correlating the electronic message to the application using the identity.

15. The method of claim 14, wherein the step of determining includes determining a name and a version number of the electronic message.

16. The method of claim 14, further comprising the step of:
    determining rules for conducting the interaction between the application and the electronic message sender based on the identity of the electronic message.

17. The method of claim 12, further comprising the step of:
    converting the electronic message to an XML format before the electronic message is received by the API.

18. The method of claim 1, wherein the step of sending the request by the processing engine includes validating the request by the rule processor prior to sending the request.

19. The method of claim 1, wherein the step of verifying the response to the request sent by the processing engine includes notifying the user of an error, if the response to the sent request is not verified.

20. A computer storage medium for storing computer program instructions when executed by a computer to cause the computer to implement the method of establishing a new user interface, the method comprising the steps of:
    separating, using a wrapper interface, a function of business logic of an application from an intermingled user interface of the application;
    hiding the intermingled user interface;
    establishing a new user interface to a user such that the separated function of the business logic of the application is exposed to the user using the wrapper interface, wherein the step of establishing the new user interface includes sending a request, by a processing engine of the wrapper interface, to the intermingled user interface using the new user interface and verifying a response to the request sent by the processing engine;
    emulating, by a rule processor using predetermined rules, interactions of the user; and
    transforming, under the control of the rule processor, a request provided through the new user interface and the emulated interactions of the user to provide a transformed request, as the request sent by the processing engine to the intermingled user interface for processing by the intermingled user interface.

21. A computer storage medium for storing computer program code including a wrapped application when executed by a computer to causes the computer to execute a method of separating business logic of an application from a user interface of the application, the wrapped application, comprising:
  application code having an intermingled user interface and business logic, the intermingled user interface being hidden;
  wrapper code for wrapping the application such that a function of the business logic of the application is separated from the intermingled user interface of the application through the wrapper code;
  new user interface code for exposing to the user the business logic of the application using the wrapper code, the new user interface code including processing code for a sending request to the intermingled user interface and for verifying a response to the sent request such that if the response to the sent request is not unverified, the new user interface code notifies the user of an error;
  emulation code for emulating, by a rule processor using predetermined rules, interactions of the user; and
  transformation code for transforming, under the control of the rule processor, a request provided through the new user interface and the emulated interactions of the user to provide a transformed request, as the request sent by the processing engine to the intermingled user interface for processing by the intermingled user interface.

* * * * *